United States Patent [19]

Clark

[11] 4,351,686
[45] Sep. 28, 1982

[54] METHOD OF BONDING SILICONE RUBBER TO NON-SILICONE ADHESIVE

[75] Inventor: David F. Clark, Burlington, Conn.

[73] Assignee: The Stanley Works, New Britain, Conn.

[21] Appl. No.: 215,133

[22] Filed: Dec. 10, 1980

[51] Int. Cl.³ ............................................. C09J 3/02
[52] U.S. Cl. ................................. 156/329; 156/315; 428/448; 428/451
[58] Field of Search .......................... 156/315, 329; 427/412.1; 428/448, 451

[56] References Cited

U.S. PATENT DOCUMENTS 2,860,083 11/1958 Nitzsche et al. .................... 156/329
2,902,389 9/1959 Keil ..................................... 156/329

OTHER PUBLICATIONS

"Silicone PSA's: Types, Properties, and Uses" from the Mar. 1979 issue of Adhesive Age Magazine, pp. 39-41.

*Primary Examiner*—George F. Lesmes
*Assistant Examiner*—B. K. Johnson
*Attorney, Agent, or Firm*—Brumbaugh, Graves, Donohue & Raymond

[57] ABSTRACT

A method of bonding a silicone rubber to a non-silicone pressure sensitive adhesive comprising the steps of treating the surface of the silicone rubber to be bonded with a silicone adhesive, and thereafter applying a layer of the non-silicone pressure sensitive adhesive to the treated silicone rubber surface.

8 Claims, No Drawings

METHOD OF BONDING SILICONE RUBBER TO NON-SILICONE ADHESIVE

As is well known in the art, silicone rubber has a low energy surface and other materials can be bonded thereto only with difficulty. This is particularly true with respect to non-silicone materials. Thus when it is desired to apply an adhesive to a silicone rubber surface, a silicone adhesive must normally be employed. Such adhesives have certain drawbacks, however, in that they require extensive mixing, application and curing equipment. In this regard, silicone adhesives normally must be dried of all solvent and then cured by adding a curing agent such as benzoyl peroxide and thereafter heating for periods of minutes. Room temperature during is also possible with other agents (e.g. amino functional silane) but again production delay results.

It is therefore an object of the present invention to provide a method of bonding silicone rubber to a non-silicone pressure sensitive adhesive. Once the non-silicone pressure sensitive adhesive is bonded to the silicone rubber, the rubber may be quickly and easily used in a variety of ways by the consumer.

For example, according to the invention silicone rubber weather stripping may be bonded to one side of a double sided non-silicone pressure sensitive adhesive tape or strip. The weather strip may then be quickly and easily applied to the door or window frame without the familiar problem of separation of the weather strip from its adhesive backing.

By providing for the bonding of double-sided pressure sensitive adhesive tapes or strips to silicone rubber, the present invention also permits the use of high speed production equipment. Thus while the use of conventional silicone adhesives requires the curing steps discussed above, the present invention renders such steps unnecessary.

Looking then to the method according to the invention, a silicone rubber, either solid or cellular, is first surface treated with a commercially available low tack silicone adhesive. The silicone adhesive is preferably one formulated to yield a high resin to gum ratio which in turn yields a low tack or tack-free surface.

Before applying the silicone adhesive, it is preferably diluted to an appropriate solids content and viscosity with a suitable solvent such as toluene. The silicone adhesive may then be applied to the silicone rubber in any suitable manner such as by brush, roller or a draw down device. The adhesive is then dried of solvent such as by forced air or radiation (e.g. infrared).

The non-silicone pressure sensitive adhesive can then be directly laminated over the cool or slightly warm modified surface of the silicone rubber. Alternatively, the non-silicone pressure sensitive adhesive may be applied to the silicone rubber at some future time. In either case, it has been found that an improved bond is obtained between the non-silicone adhesive and the surface of the silicone rubber.

The types of non-silicone adhesives usable in accordance with the invention will be readily apparent to one skilled in the art. These adhesives include natural rubber adhesives, acrylic adhesives and synthetic rubber adhesives such as styrene butadiene rubber adhesives.

With respect to the choice of an appropriate silicone adhesive, General Electric Silgrip® adhesive SR 529, which is believed to be a methyl based silicone adhesive having a high resin to gum ratio, has been found to be satisfactory. Silgrip® SR 529 is described in General Electric product data as having the following properties:

| PROPERTY | VALUE |
| --- | --- |
| Non-Volatile Content, % | 55 ± 1 |
| Color | Light straw, translucent |
| Viscosity, CPS Brookfield RVF, #3 20 rpm at 25C. | 1000 to 5000 |
| Specific Gravity | .984–1.008 |
| Wt. Per Gallon, Lbs. | 8.2–8.4 |
| Solvent | Toluene |
| Adhesion (g/2.54 cm) | 1440 to 2800 |
| Tack | Dry |
| Storage Stability, 25C. (77F.) Closed Container | 6 months minimum |

While this adhesive is described as a pressure sensitive adhesive, it is important to note that it yields a dry (i.e. non-tacky) surface and hence it is not sufficiently pressure sensitive for household applications.

It is also important to note that once the silicone adhesive has been applied to the silicone rubber and dried, it is neither necessary nor desirable to cure the adhesive (i.e. to cause cross-linking to take place within the adhesive) by the addition of peroxide or the like. This is to be distinguished from conventional methods of bonding utilizing silicone adhesives wherein it is necessary to cure the silicone adhesive in order to obtain the desired adhesive properties. In this regard, the General Electric literature instructions as to the use of its Silgrip® SR 529 stress the necessity of curing with benzoyl peroxide or amino functonal silane for maximum cohesive strength.

It will be apparent to one skilled in the art that the bonded composition of silicone rubber and non-silicone adhesive may take a variety of forms. As poined out above, the treated silicone rubber surface may have bonded thereto a double-sided non-silicone pressure sensitive tape or strip. Alternatively, a non-silicone pressure sensitive adhesive composition may be applied directly to the treated silicone rubber surface without employing an adhesive carrying tape or strip. In this latter embodiment, the exposed surface of the pressure sensitive adhesive serves to adhere the silicone rubber to the structure in question.

It is also important to note that by permitting the use of non-silicone adhesives to adhere silicon rubber to various surfaces, the present invention also makes available a much wider variety of conventional release liners and the like. Many such liners cannot be used with silicone adhesives and the use of non-silicone adhesives overcomes this problem.

EXAMPLE

GE Silgrip® SR 529 was diluted in toluene and applied at the end of a silicone rubber extruding process in an amount to yield a dry film thickness of 0.0005 to 0.001 inches. Drying was accomplished with an oven temperature from 300° F. to 350° F. for a period of from about 15 seconds to about one minute. Non-silicone pressure sensitive adhesive was then directly laminated over the treated surface. An acceptable bond was obtained both when the adhesive was laminated while the treated surfaces was still warm and when the surface was allowed to cool or after storage.

I claim:

1. A method of bonding a silicone rubber to a non-silicone pressure sensitive adhesive comprising the steps of treating the surface of the silicone rubber to be bonded with a silicone adhesive, and thereafter applying a layer of the non-silicone pressure sensitive adhesive to the treated silicone rubber surface so as to obtain an immediate bond between said layer and said surface.

2. A method according to claim 1 wherein the silicone adhesive is not cured with a curing agent prior to the application of the non-silicone pressure sensitive adhesive.

3. A method according to claim 2 wherein the non-silicone pressure sensitive adhesive is applied to the treated silicone rubber surface in the form of a carrier sheet having non-silicone pressure sensitive adhesive on both sides of said sheet.

4. A method according to claims 1, 2 or 3 wherein the silicone adhesive is diluted prior to being applied to the silicone rubber.

5. A method according to claim 4 wherein the silicone adhesive is diluted with toluene.

6. A method according to claim 5 wherein the toluene solvent is dried from the treated silicone rubber surface prior to the application of the non-silicone adhesive.

7. A method according to claim 6 wherein the silicone adhesive is formulated to yield a high resin to gum ratio.

8. A method of bonding a non-silicone pressure sensitive adhesive to silicone rubber weather stripping comprising the steps of treating the surface of the weather stripping with a solution of silicone adhesive dissolved in toluene, drying the toluene from the treated surface so as to yield a low tack or tack-free surface, and thereafter applying to the treated surface a carrying tape or strip having on both sides thereof a non-silicone pressure sensitive adhesive so as to obtain an immediate bond between said tape or strip and said surface.

* * * * *